United States Patent [19]

Givens

[11] Patent Number: 5,285,834
[45] Date of Patent: Feb. 15, 1994

[54] NO-SKID SPRING CHAIN

[76] Inventor: Robert E. Givens, 2231 S. Illinois Ave., Carbondale, Ill. 62901

[21] Appl. No.: 13,730

[22] Filed: Feb. 4, 1993

[51] Int. Cl.$^5$ ............................................. B60C 27/06
[52] U.S. Cl. ............................ 152/208; 152/213 A; 152/239
[58] Field of Search ............... 152/169, 170, 173, 175, 152/176, 187, 188, 231, 220, 221, 197, 208, 213 A, 213 R, 239

[56] References Cited

U.S. PATENT DOCUMENTS

| | | | |
|---|---|---|---|
| 922,631 | 5/1909 | Reddaway | 152/176 |
| 985,884 | 3/1911 | Clark | 152/176 |
| 1,244,244 | 10/1917 | Riker | 152/220 |
| 1,293,528 | 2/1919 | Palmer | 152/209 WT |
| 1,489,318 | 4/1924 | Fuller | 152/179 |
| 1,681,125 | 8/1928 | Markwick | 152/176 |
| 1,848,444 | 3/1932 | Tully | 152/220 |
| 2,276,640 | 3/1942 | Ansel | 152/208 |
| 3,400,744 | 9/1968 | Muller | 152/208 |
| 4,334,566 | 6/1982 | Augustine | 152/208 |

Primary Examiner—Michael W. Ball
Assistant Examiner—Francis J. Lorin
Attorney, Agent, or Firm—Jacobson, Price, Holman & Stern

[57] ABSTRACT

A pneumatic tire is provided with a central tread area circumferential groove extended thereabout and a skid chain consisting of a link chain section having opposite ends and a generally cylindrical expansion spring semi-permanently interposed between and connected to the skid chain section opposite ends, the link chain section and expansion spring being seatingly received within the groove with the convolutions of the normally closed convolution expansion spring being slightly spaced apart and the link chain section having a generally square cross sectional shape including rounded corners to enable the final segment of the link chain section to be placed within or removed from the groove to be "rolled" over the associated side area of the outer peripheral tread area of the tire.

3 Claims, 1 Drawing Sheet

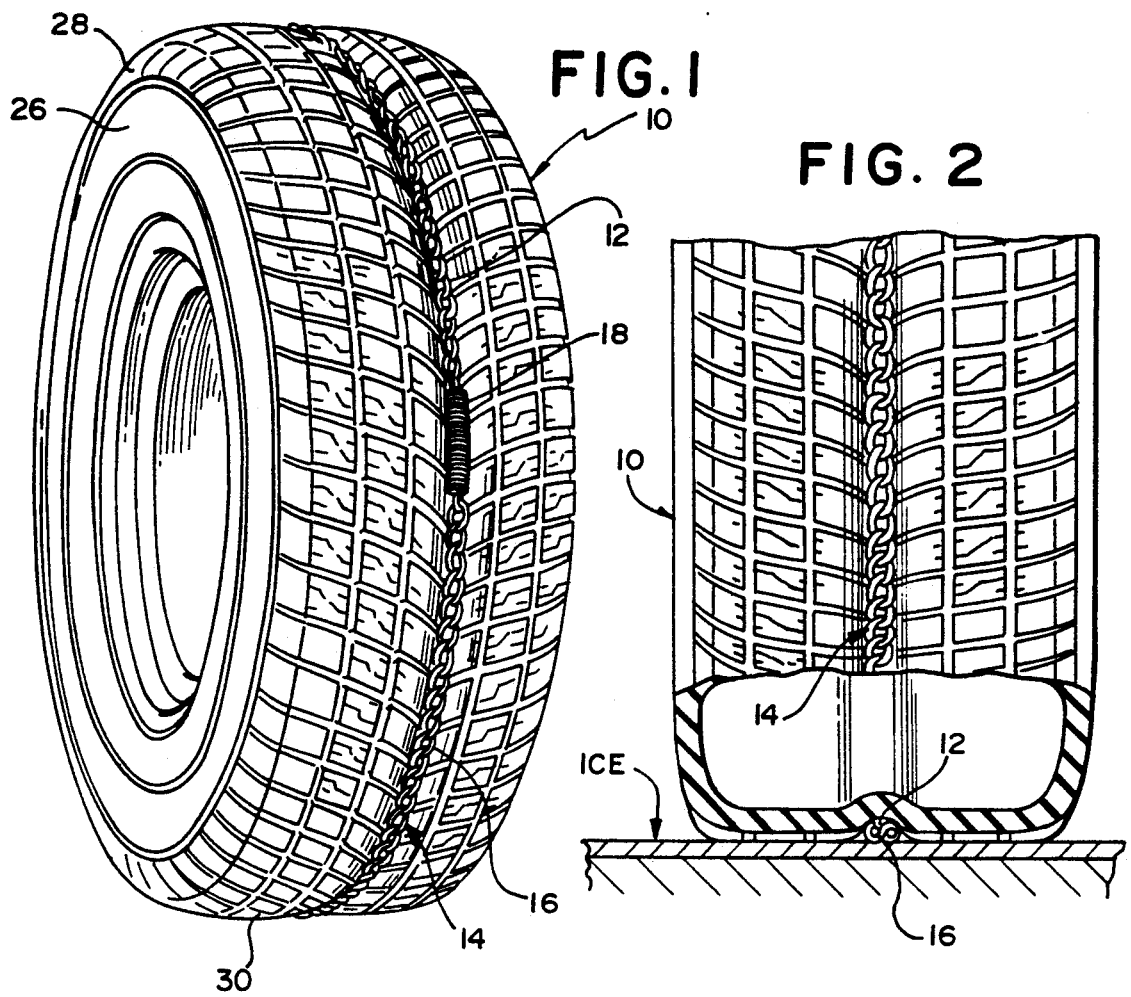
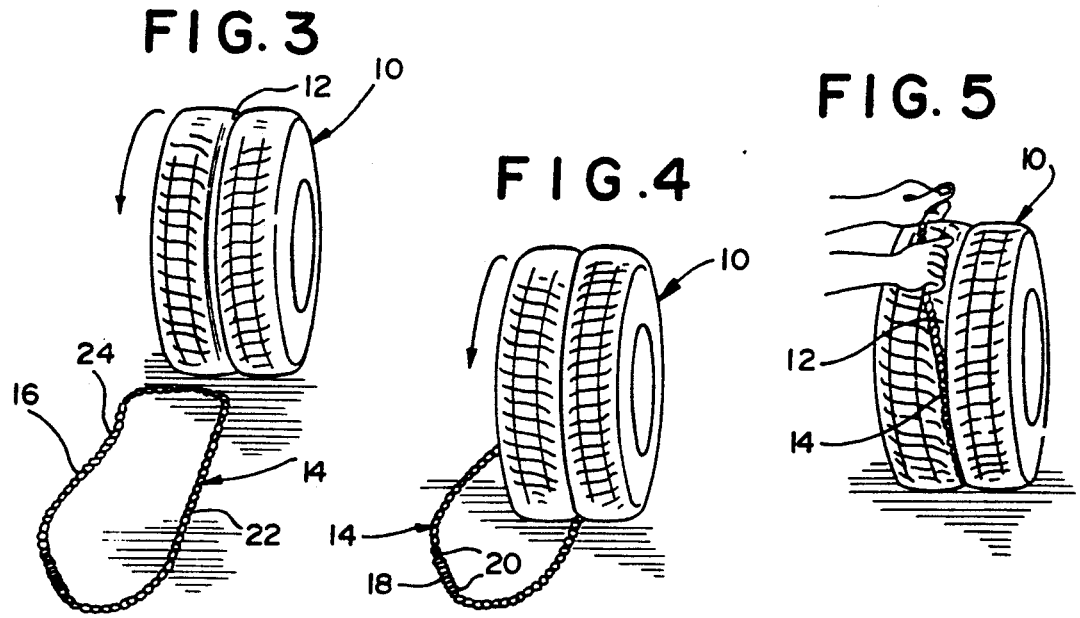

NO-SKID SPRING CHAIN

BACKGROUND OF THE INVENTION

1. Field of the Invention

This invention relates to a single circumferential chain incorporating a link chain section having opposite ends semi-permanently joined together by a three to four inch expansion spring of the closed coil type extending between the chain section ends with the chain to be stretched over the circumference of a vehicle tire equipped with a central tread area groove for snug seating of the link chain section and the spring within the groove and with the spring in a slightly open coil state.

2. Description of Related Art

Various different forms of central tread groove applied chains and cables heretofore have been provided including those disclosed in U.S. Pat. Nos. 922,631, 985,884, 1,293,528 and 2,276,640. In addition, other similar types of tire tread area traction improving devices have been provided such as those disclosed in U.S. Pat. Nos. 1,489,318 and 3,400,744. However, these previously known devices have not been constructed to allow relatively easy installation thereof on a pneumatic tire when the chain, cable or other traction devices are in a continuous loop form.

SUMMARY OF THE INVENTION

The skid chain of the instant invention comprises a length of machine twist chain #2 or #3 in size (occupying a generally square cross sectional area including rounded corners and wherein the transverse dimension of each of the chain sides is approximately ⅜ inch to ½ inch).

The skid chain is to be used in conjunction with a pneumatic tire having a central tread area circumferential groove in which the chain is to be seatingly received and the chain is of a length approximately 3 to 4 inches less than the circumference of the tire measured midway the depth of the groove. The opposite ends of the chain are interconnected, semi-permanently by a coil spring of substantially the same diameter as the width of the chain and of the closed coil type. The overall length of the skid chain loop comprising the chain link section and the spring is slightly less than the circumference of the associated tire measured midway the depth of the groove such that the spring connecting the ends of the chain link section will be at least slightly expanded when the skid chain loop is seated within the groove, it being understood that the width of the skid chain loop in relation to the seated position of the chain within the groove is such that approximately ⅛ to ¼ inch of the skid chain loop tends to project from the groove at the lower periphery of the associated tire when the tire is disposed upon a snow covered surface.

The main object of this invention is to provide a skid chain primarily designed for use in conjunction with newly constructed radial ply tires having central circumferential tread grooves therein. Such a tire to be used in conjunction with the instant invention comprises the "GOODYEAR" "AQUATREAD" tire whose tread design is specifically adapted to reduce aquaplaning.

Another object of this invention is to provide a skid chain in the form of a continuous loop which may be readily applied to a drive wheel of a vehicle equipped with radial ply tires incorporating at least one central tread area circumferential groove.

A further object of this invention is to provide a skid chain in accordance with the preceding objects and which may be adaptable to various different makes of pneumatic tires provided with central circumferential grooves.

Still another important object of this invention is to provide a skid chain which will offer appreciable increased traction but which will be considerably less expensive than conventional skid chains.

Another object of this invention is to provide a skid chain which will like wise be readily removable from the associated radial ply tire.

A final object of this invention to be specifically enumerated herein is to provide a skid chain in accordance with the preceding objects and which will conform to conventional forms of manufacture, be of simple construction and easy to use so as to provide a device that will be economical feasible, long lasting and relatively trouble fee in operation.

These together with other objects and advantages which will become subsequently apparent reside in the details of construction and operation as more fully hereinafter described and claimed. Reference being had to the accompanying drawings forming a part hereof, wherein like numeral refers to like parts throughout.

BRIEF DESCRIPTION OF THE DRAWINGS

FIG. 1 is a perspective view of a tire equipped with a central tread area circumferential groove in which the skid chain of the instant invention is operatively seated;

FIG. 2 is an enlarged end elevational view of the lower periphery of the tire illustrated in FIG. 1 with the lower portion o the tire and the chain broken away and illustrated in vertical section in order to demonstrate the manner in which the skid chain will bite into snow and or ice on a surface over which the tire is rolling; and FIGS. 3, 4 and 5 are schematic views illustrating the manner in which the skid chain may be applied to a tire such as that illustrated in FIG. 1.

DESCRIPTION OF THE PREFERRED EMBODIMENT

Referring now more specifically to the drawings the numeral 10 generally designates a radial ply tire having a central tread area circumferential groove 12 formed therein.

The skid chain of the instant invention is referred to in general by the reference numeral 14 and incorporates a link chain section 16 constructed of #2 or #3 size machine twist chain. The link chain section is on the order of 3¾ inches less than the circumference of the tire 10 measured midway the depth of the groove 12 and the opposite ends of the link chain section are semi-permanently connected by a coil spring 18 having substantially fully closed eyes 20 on its opposite ends passing through the end links of the link chain section 16.

On a 13 inch tire (bead diameter) a #2 machine twist chain requires approximately 124 links and, as stated herein above, the effective length of the spring 18 is between 3½ and 3¾ inches.

As may be seen from FIG. 2 of the drawings, the link chain section 16 projects between ⅛ inch and ¼ inch outwardly of the groove 12 formed circumferentially about the tread area of the tire 10. When the skid chain 14 is to be applied to the tire 10 the skid chain 14 is layed out upon the ground in front of the tire 10 with a straightened section 22 thereof aligned with the groove 12 immediately ahead of (or behind) the tire 10. Then, the associated vehicle is moved forwardly until the lower periphery of the tire 10 is approximately centered along the straighten section 22. Then, the section 24 of the link chain section 16 opposite the straightened section 22 thereof is moved upwardly along the outer side of the tire 10 until the skid chain 14 is somewhat tensioned. At this point the upper portion of the section 24 of the skid chain 14 will be disposed approximately at the juncture of the upper portion of the side wall 26 and the adjacent edge portion 28 of the tread area 30 of the tire 10. At this point, both hands are used to "roll" the upper portion of the skid chain upwardly from the upper limits of the side wall 26 onto and over the outside portion of the tread area 30 of the tire 10. As this is carried out, the relatively strong and normally closed convolution coil spring 18 is stretched to provide the additional effective circumference of the loop defined by the skid chain 14 enabling the upper portion of the skid chain 14 to pass fully over the outer side portion of the tread area 30 at the upper periphery of the tire 10 and seat into the groove 12. Of course, as the skid chain 14 seats into the groove 16, the spring 18 contracts to a position such that the convolutions thereof are only very slightly spaced apart. This maintains a snug fit of the skid chain 14 within the groove 12.

The progression of the manner in which the skid chain 14 is applied to the tire 10 is clearly illustrated in FIGS. 3, 4 and 5 and it is pointed out that the generally square cross sectional shape of the link chain section 16, including rounded corners, as well as the cylindrical cross sectional shape is critical to the ability of the average person being able to "roll" the upper portion of the skid chain upwardly from the sidewall 26 onto and over the outer side portion of the tread area 30 and into the groove.

When it is desired to remove the skid chain 14 from the groove 12, either the expansion spring 18 or an adjacent portion of the skid chain 14 may be gripped by the fingers and pulled upwardly and rolled outwardly of the groove 12 toward the outer side periphery of the tread area 30 of the tire and removed therefrom by substantially reversing the steps illustrated in FIGS. 3, 4 and 5.

It is to be understood that larger size tires may include larger width grooves. In such instance, a slightly large #3 machine twist chain may be used as opposed to a #2 machine twist chain utilized on a 13 inch tire.

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalence may be resorted to, falling within the scope of the invention.

What is claimed as new is as follows:

1. In combination with a pneumatic tire of the type having a central tread area circumferential groove therein, a loop-type skid chain construction for application to and disposition about the center tread area of said tire, said skid chain construction comprising a length of chain having a generally square cross sectional shape with rounded corners and opposite end portions with terminal end links, a generally cylindrical expansion spring interposed between and having opposite ends semi-permanently anchored to said terminal end links, the length of said chain plus the effective length of said spring defining a skid chain loop of slightly less than the circumference of said groove measured approximately at the $\frac{1}{2}$ depth level of said groove when said spring is collapsed, said chain and spring being seated in said groove and projecting radially outwardly therefrom between $\frac{1}{4}$ and $\frac{3}{8}$ inches, the generally square cross sectional shape of said length of chain with rounded corners and the cylindrical configuration of said spring enabling said spring and the adjacent chain end portions, when comprising the last portion of chain to pass over the outer side tread area of said tire, to be "rolled" thereover.

2. The tire and skid chain construction of claim 1 wherein said cylindrical expansion spring comprises a closed convolution coiled expansion spring.

3. The tire and skid chain construction of claim 1 wherein said length of chain comprises a length of machine twist chain.

* * * * *